United States Patent
Michael

(10) Patent No.: US 10,436,253 B2
(45) Date of Patent: Oct. 8, 2019

(54) BICYCLE ROLLING-ELEMENT BEARING ASSEMBLY

(71) Applicant: Aktiebolaget SKF, Gothenburg (SE)

(72) Inventor: Benjamin Michael, Werneck (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/460,563

(22) Filed: Mar. 16, 2017

(65) Prior Publication Data

US 2018/0003232 A1    Jan. 4, 2018

(30) Foreign Application Priority Data

Jun. 29, 2016   (DE) .................. 10 2016 211 690

(51) Int. Cl.
| | |
|---|---|
| *F16C 19/16* | (2006.01) |
| *F16C 33/41* | (2006.01) |
| *F16C 33/66* | (2006.01) |
| *F16C 19/06* | (2006.01) |
| *B62M 3/00* | (2006.01) |
| *B60B 27/00* | (2006.01) |
| *B62K 21/06* | (2006.01) |
| *F16C 11/04* | (2006.01) |

(52) U.S. Cl.
CPC ........ *F16C 33/6611* (2013.01); *B60B 27/001* (2013.01); *B62K 21/06* (2013.01); *B62M 3/003* (2013.01); *F16C 33/41* (2013.01); *F16C 33/6648* (2013.01); *F16C 11/045* (2013.01); *F16C 19/06* (2013.01); *F16C 19/163* (2013.01); *F16C 2326/26* (2013.01); *F16C 2326/28* (2013.01)

(58) Field of Classification Search
CPC .......... F16C 19/08; F16C 19/18; F16C 19/54; F16C 19/542; F16C 19/547; F16C 33/44; F16C 33/6648; F16C 33/6651; F16C 33/3837; F16C 33/3862; F16C 33/38543; F16C 33/41; F16C 33/6611; F16C 2326/26; F16C 33/28
See application file for complete search history.

(56) References Cited

U.S. PATENT DOCUMENTS

| | | | | |
|---|---|---|---|---|
| 4,406,504 A | * | 9/1983 | Coenen ................... | F16C 19/54 384/458 |
| 5,918,986 A | * | 7/1999 | Matsui .................... | F16C 33/30 384/470 |
| 5,984,528 A | * | 11/1999 | Ohtsu ..................... | F16C 19/18 384/458 |

(Continued)

OTHER PUBLICATIONS

SKF Article "Sieg in der Schlammschlacht: SKF löst Lagerproblem in Mountainbikes", Mar. 22, 2016.

*Primary Examiner* — James Pilkington
(74) *Attorney, Agent, or Firm* — Bryan Peckjian; SKF USA Inc. Patent Dept.

(57) ABSTRACT

A bicycle rolling-element bearing assembly includes an outer bearing ring, an inner bearing ring, a plurality of rolling elements disposed between the outer bearing ring and the inner bearing ring and rotatably supporting the outer bearing ring relative to the inner bearing ring, and a lubricant reservoir, configured as a first cage, for storing and dispensing a lubricant, the first cage including bridge elements extending between the rolling elements and at least one side ring connecting the bridge elements.

13 Claims, 2 Drawing Sheets

(56) References Cited

U.S. PATENT DOCUMENTS 6,485,184 B1 * 11/2002 Adachi .............. F16C 33/6611
                                                          384/463
8,063,002 B2 * 11/2011 Kitahata ............. F16C 33/6648
                                                          384/13

* cited by examiner

BICYCLE ROLLING-ELEMENT BEARING ASSEMBLY

CROSS-REFERENCE

This application claims priority to German patent application no. 10 2016 211 690.8 filed on Jun. 29, 2016, the contents of which are fully incorporated herein by reference.

TECHNICAL FIELD

The invention relates to a bicycle rolling-element bearing assembly.

BACKGROUND

Rolling-element bearings, in particular ball bearings, are used in various locations on bicycles. These include, among other, the bottom-bracket bearing, the wheel hubs, the steering-tube- or headset-bearing, the rear-derailleur roller bearing, as well as bearing assemblies of the swingarm chainstay. When the bicycle is used in muddy or other dirty areas, with fresh- or salt-water contact, as well as with rainy and windy weather conditions, followed by possibly strong cleaning forces, e.g., with the use of a high-pressure cleaner, these bearings are also subjected to heavy loads. This applies in particular for mountain bikes which tend to be used in harsh conditions.

SUMMARY

An aspect of the present disclosure is therefore to provide a bicycle rolling-element bearing assembly that has a long service life even with the above-mentioned use conditions.

According to a first aspect of the disclosure a bicycle rolling-element bearing comprises an outer rolling-surface element, an inner rolling-surface element, a set of rolling elements disposed between the rolling-surface elements such that the rolling-surface elements are at least pivotable against each other in the manner of a rolling-element bearing, and a lubricant reservoir, configured at least as a prong-type cage, for storing and dispensing a lubricant with bridge elements extending between the rolling elements and a side ring connecting the bridge elements.

In particular with bad weather, mountain biking in open terrain can lead very quickly to extreme loading of rolling-element bearing assemblies of the mountain bike due to mud, water, and dirt. In addition, cleaning mountain bikes can cause water to penetrate into the bearings if their seals or cover plates are "pushed in" by a high-pressure stream, and cleaning often enough occurs with more than 15 bar water pressure. However, common standard seals, such as are normally installed in mountain-bike rolling-element bearing assemblies, should only be subjected to maximum pressure differences of approximately one bar. As a result, water and other foreign substances can reach the interior of the bearing, the lubricant cannot sufficiently protect the steel surfaces in the bearing, and chemical reactions occur. Pitting and crevice corrosion cause possible peeling and cracks, which in the worst case even endanger the safety of the rider, for example, in the event of an abruptly locking wheel-hub bearing. In particular if the mountain bike rests in a garage or basement after cleaning, due to the capillary effect, water can penetrate into the bearing and form rust.

Furthermore, conventional rolling-element bearings are delivered with a grease filling level of 25 to 35 percent of the free volume in the bearing. With the above-described usage, as well as cleaning-stress, in addition to the seals or cover plates of the bearing this is not sufficient to effectively prevent the above-described consequences due to the penetrating of dirt or even of aggressive liquids such as salt water.

Therefore according to the disclosure the bearing is filled with a lubricant reservoir, in particular a polymer matrix impregnated with oil, which, so to speak, fills up the free space in the bearing and at least partially surrounds the possibly present cage as well as the rolling elements. A suitable product for forming the lubricant reservoir is available from SKF USA Inc. and/or SKF Inc. of Goteborg, Sweden, under the tradename "solid oil." By using the lubricant reservoir the above-described corrosion risk is minimized With an almost complete filling of the bearing interior with the lubricant reservoir the water cannot effectively enter into the bearing. The rolling-element bearing are protected against contamination and premature failure.

Said lubricant reservoir is preferably used if the bearing locations are difficult to access and relubrication is difficult, or if the bearing location must withstand aggressive cleaning agents. Here the matrix forms a very good protection against the penetration of cleaning agents, contaminants, and thus ultimately corrosion. Due to the presences of the lubricant reservoir the rolling-element bearing is practically maintenance-free, with the result that relubrication is obsolete.

Further advantages of this solution are that the oil always remains at the use point, it does not escape and does not contaminate its environment. Significantly more lubricant is deposited in the bearing than with a conventional grease lubrication. The polymer matrix is environmentally friendly and makes possible the same load rating as standard bearings. In addition, this matrix cannot be washed out by water.

In order to test the suitability of the polymer filling, the bearing assemblies of the hubs of the mountain bike have been selected for the tests, since these represent the greatest weak point. Subsequently a nearly one-year stress test followed of 5,500 kilometer running performance (including over 90 height kilometers) with a terrain- and gravel-proportion of 87% with a total use time of 228 hours; thereof 31 percent with rain or wet conditions, including a four-time thorough cleaning of the bicycle under high pressure. After conclusion of the stress test it is unambiguously established that the oil-immersed polymer matrix significantly minimizes the corrosion risk as well as condensation formation. In addition, the additional sealing by RS1® seals has proven valuable as enhanced protection against water ingress and rust. Since due to the relatively large oil reservoir in the bearing the lubricant reservoir contains two- to four-times more base oil than a bearing having conventional grease lubrication, relubrication could furthermore be completely omitted during the entire test phase. The test even eliminated initial concerns regarding a possibly increased internal friction: the inventively equipped wheels showed the same behavior as standard wheels.

The disclosed lubricant reservoir is suitable for use in rolling-element bearings in swingarms of full-suspension wheels, in the bottom-bracket bearing, in hubs of wheels, in rear-derailleur rollers, as well as in steering tube or headset bearings.

Here in particular the bias of the experts that the lubricant reservoir acts negatively on the smooth running characteristics required in particular with mountain biking could be refuted. The coefficient of friction is not adversely affected. Other feared negative effects due to the use of the lubricant reservoir as a so-called additional object having mass to be circulated could also be refuted.

Compared to a conventional rolling-element bearing equipped with contacting or contactless seals the advantage results in particular that due to the presence of the lubricant reservoir, even in the event of a cleaning with relatively high pressures, a pressing inward and thus a leakage of the bearing seals is securely prevented by the mechanical support provided by the lubricant reservoir. Compared to a conventional rolling-element bearing with contacting abutting seals, the further advantage arises that even after the contacting abutting seal lips wear out, the rolling-element bearing furthermore remains sufficiently protected by the lubricant reservoir against external influences. This is independent of whether the rolling-element bearing including the lubricant reservoir is also configured with contacting seals, which of course can also wear out, but then not with the fatal consequences as with comparable conventional bearings, or whether it is equipped with contactless seal discs, which have actually also been installed after a wearing out of the contacting seals, or whether already from the beginning onward it is equipped entirely without seals, only with the lubricant reservoir.

With the forming of the lubricant reservoir as an oil-impregnated matrix only very narrow intermediate spaces remain between the rolling elements and raceways after the pressing-in of the polymer material. This allows for the unimpeded circulating of the bearing parts. The polymer material has a porous structure with millions of microscopically small pores that retain the oil due to surface tension. In use the oil is discharged from the polymer material into the narrow intermediate spaces between it and the bearing parts and thus ensures an efficient minimum-quantity lubrication.

The disclosure thus provides the following properties and advantages: a longer lubricant service life results and greater amounts of oil are available than with a comparable grease lubrication. In addition, no grease friction arises. An environmentally friendly, high-quality, and/or oxidation-resistant synthetic oil can be used. The lubricant reservoir makes the lubricant introduction resistant to being flushed out. Furthermore, penetrating water cannot mix with the oil or polymer material. Lubricant leaks are practically precluded since the polymer matrix retains the oil in the bearing. Seals in the bearing increase the oil retention time even further. Furthermore an additional protection arises against the penetrating of contaminants. The close osculation between the polymer structure, the rolling elements, and raceways very significantly reduces the penetration of contaminants. Furthermore the lubricant reservoir also supports seals present on the bearing, since a bending inward of the seals and leakages associated therewith are prevented by the lubricant reservoir.

BRIEF DESCRIPTION OF THE DRAWINGS

Further advantages, features, and details of the invention arise from the exemplary embodiments of the invention described below with reference to the Figures.

DETAILED DESCRIPTION

Figure 1:
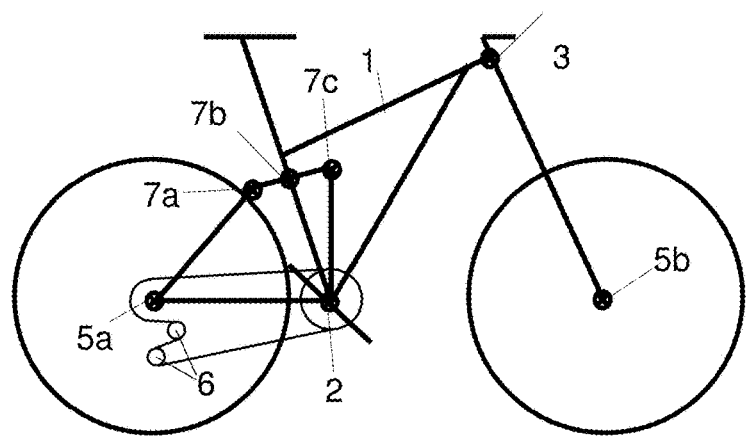
FIG. 1 is a schematic depiction of a mountain bike and its bearing locations that can be provided with a bearing according to the present disclosure.

FIG. 1 shows a schematic representation of a mountain bike including a bicycle frame 1 and bearing locations at which the disclosed rolling-element bearing configuration is usable with particular advantage. In particular they are the two wheel hubs 5a and 5b, the bottom-bracket bearing 2, as well as the rear-derailleur roller bearing 6, wherein the rolling-element bearings used there are loaded by rotation. This furthermore relates to the steering-tube- or headset-bearing 3 as well as the bearings 7a, 7b, and 7c of the swingarm chainstay of the mountain bike, wherein these bearings 3, 7a, 7b, and 7c are subjected to a pivoting movement. Of course with other frame configurations of a mountain bike the pivotable or rotatable connection points can also be equipped with inventively configured rolling-element bearings.

Figure 2:
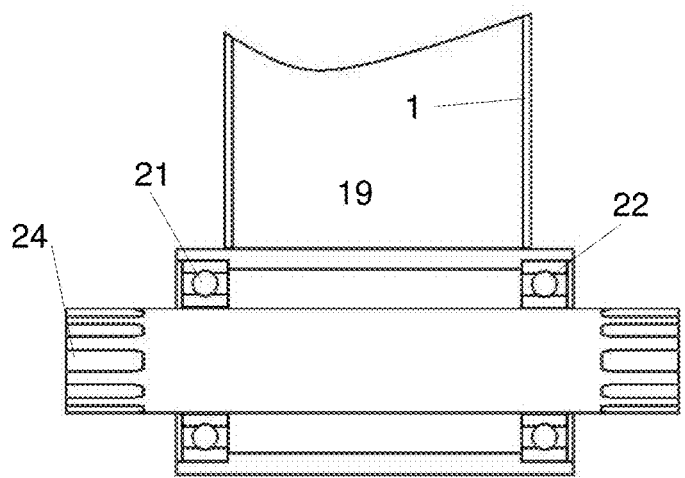
FIG. 2 is a longitudinal section of the bottom-bracket bearing of FIG. 1.

FIG. 2 shows a longitudinal section through the bottom-bracket bearing 2 from FIG. 1. Here the crankshaft 24, which is drivable by the two pedals, is rotatably supported via two single row ball bearings 21 and 22 over a corresponding recess 19 in the bicycle frame 1. As illustrated in FIG. 2 the two ball bearings 21 and 22 of the bottom-bracket bearing 2 are configured, for example, in accordance with the deep groove ball bearings of FIG. 3 or 4.

Figure 3:
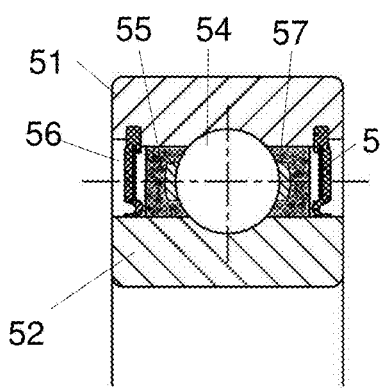
FIGS. 3 and 4 are sectional elevational views of the upper region of deep groove ball bearings of the bottom-bracket bearing.

FIG. 3 shows the upper region of a longitudinal section through a deep groove ball bearing such as is inventively usable as ball bearings 21 and 22 in the bottom-bracket bearing. The deep groove ball bearing comprises an outer rolling-surface element 51 that is annular in the exemplary embodiment shown here, and is formed, for example, from a through- or case-hardened rolling-element-bearing- or case-hardening-steel. In other embodiments, the outer rolling-surface element 51 can of course also be configured as an integral component of a housing and formed from other suitable materials. Furthermore, the deep groove ball bearing comprises an inner rolling-surface element 52, for which the above description for the outer rolling-surface element 51 correspondingly applies, so that, for example, the inner-surface element 52 can also be an integral component of a shaft. Between the rolling-surface elements 52 and 51 a set of spherical rolling elements 54 is disposed that are provided for rolling on the raceway surfaces of the inner and outer rolling-surface elements 52 and 51, with the result that via the rolling elements 54 the rolling-surface elements 51 and 52 are pivotable or rotatable against each other in the manner of a rolling-element bearing. Here the rolling elements 54 are disposed and optionally retained in a cage 55 that prevents a mutual contacting of the rolling elements 54. The cage 5 can be formed from a suitable material, for example, a metal alloy or plastic. The first and second seals 56 each, in combination with the lubricant reservoir 57, define an empty gap which extends from an outer surface of the inner rolling-surface element 52 (inner bearing ring) to an inner surface of the outer rolling-surface element 51.

The space between the outer and inner rolling-surface elements 51 and 52, which space contains the rolling elements 54 is sealed here from outside in by seals 56, wherein the seals 56 configured in a disc-type manner are retained in the outer rolling-surface element 51, for example, by a snapping-in into a corresponding groove, and inwardly contactingly abut on the inner rolling-surface element 52 with a seal lip in the manner of a contacting seal. The space remaining near the rolling elements 54 and the cage 55 between the outer and inner rolling-surface element 51 and 52 as well as between the seals 56 is filled by the lubricant reservoir 57, i.e., by a body of "solid oil" in a proportion of greater than 80%. In other embodiments, also depending on the respective seal design, fillings of greater than 90% up to 95%, 97%, or even close to 100%, are possible. Here the lubricant reservoir 57 is formed from a polymer matrix impregnable with a lubricating oil, which polymer matrix may comprise "solid oil" available from SKF USA Inc. and/or SKF Inc. of Goteborg, Sweden. In other embodiments the cage 55 can also be omitted, with the result that its space as well as function is filled by the lubricant reservoir 57.

Figure 4:
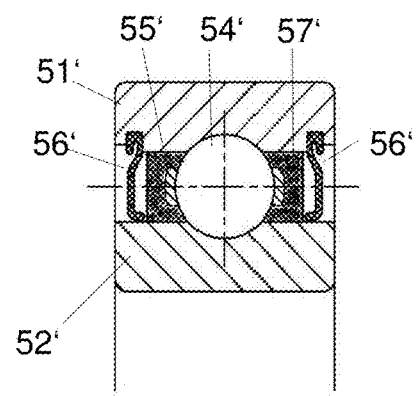

FIG. 4 shows the upper region of a longitudinal section through a further deep groove ball bearing as is usable as ball bearings 21 and 22 in the bottom-bracket bearing 2. Here the deep groove ball bearing of FIG. 4 differs from that of FIG. 3 only in that instead of the contacting seals 56 integrated into the bearing, now a seal disc 56' forming a seal gap is used. Otherwise the above correspondingly applies to the deep groove ball bearing described of FIG. 3, wherein comparable components having the same reference numbers are supplemented by an apostrophe. Accordingly, FIG. 4 illustrates outer rolling-surface element 51', inner rolling-surface element 52', rolling element 54', and lubricant reservoir 57'.

In other embodiments the bearings of FIGS. 3 and 4 can also be disposed with only one seal 56 or 56' exclusively on the outside of the bottom-bracket bearing 2 facing away from the interior of the bottom-bracket bearing 2, since the inner sides are in any case shielded from external influences. In yet another not-depicted embodiment bearings can be also used according to FIGS. 3 and 4 entirely without seals 56 and 56'.

Figure 5:
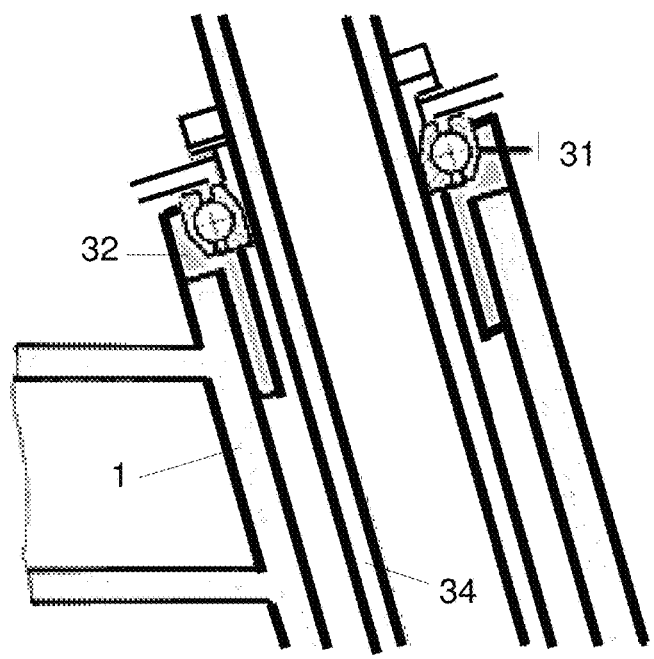
FIG. 5 is a longitudinal section of the steering-tube bearing from FIG. 1.

FIG. 5 shows a cross-section through a region of the steering-tube bearing 3. Here a bearing shell 32 is disposed in the correspondingly configured bicycle frame 1, in which bearing shell 32 an angular contact ball bearing 31 is disposed that pivotably supports the steering tube 34 of the bicycle fork with respect to the bicycle frame 1. Here the angular contact ball bearing 31 inventively used with the headset bearing 3 is depicted in more detail in FIG. 6.

Figure 6:
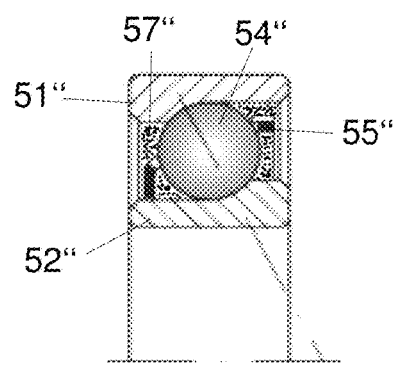
FIG. 6 is the upper region of a longitudinal section through the angular contact ball bearing of the steering-tube bearing.

Here FIG. 6 shows the upper region of a longitudinal section through the angular contact ball bearing 31. In principle the description above for the bearings of FIGS. 3 and 4 correspondingly applies, so that comparable components having the same reference numbers are supplemented by two apostrophes. Unlike in FIGS. 3 and 4 the angular contact ball bearing of FIG. 6 is configured without seals, with the result that the above-described percentage values for space filling by the lubricant reservoir 57" apply in the angular contact ball bearing of FIG. 6 for the space containing the rolling elements 54", which space arises in that, so to speak, a line, in particular a straight line, connecting the respective end sides of the rolling-surface elements 51" and 52" is introduced in the sense of an enveloping of the two rolling-surface elements 51" and 52". In other embodiments the angular contact ball bearing of FIG. 6 as described for FIGS. 3 and 4 can of course also be equipped with seals shown there on both sides, or as also described above, only on one side. FIG. 6 also illustrates a cage 55".

In other embodiments, instead of the depicted deep-groove- and angular-contact-ball bearings, of course other ball bearings, for example, three- or four-point ball bearings, but also roller bearings, for example cylindrical roller bearings, can be used, and/or also multi-row rolling-element bearings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bicycle wheel bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bicycle rolling-element bearing assembly comprising:
    an outer bearing ring,
    an inner bearing ring,
    a plurality of rolling elements disposed between the outer bearing ring and the inner bearing ring and rotatably supporting the outer bearing ring relative to the inner bearing ring,
    a cage comprising:
        a first cage forming a lubricant reservoir for storing and dispensing a lubricant, the first cage including bridge elements extending between the rolling elements and at least one side ring connecting the bridge elements; and
        a second cage formed from metal or plastic, the first cage at least partially enclosing the second cage;
    wherein the inner bearing ring and the outer bearing ring define a space containing the plurality of rolling elements and the lubricant reservoir, a first seal acts between the inner bearing ring and the outer bearing to seal one side of the space and a second seal acts between the inner bearing ring and the outer bearing ring to seal a second side of the space, wherein the first and second seal each, in combination with the lubricant reservoir define an empty gap which extends from an outer surface of the inner bearing ring to an inner surface of the outer bearing ring, wherein the first cage occupies at least ninety percent (90%) of the space that is not occupied by the plurality of rolling elements and the second cage.

2. The bicycle rolling-element bearing assembly according to claim 1, wherein first cage comprises a window cage.

3. The bicycle rolling-element bearing assembly according to claim 1, wherein the lubricant reservoir is spaced from the rolling elements and substantially fills a space between the inner bearing ring and the outer bearing ring.

4. The bicycle rolling-element bearing assembly according to claim 1, wherein the first cage is configured in a porous manner, the lubricant reservoir is formed from a polymer matrix, and/or the lubricant is a lubricating oil.

5. The bicycle rolling-element bearing assembly according to claim 1, wherein the rolling-element bearing assembly is configured as an angular-contact- or deep-groove-ball bearing.

6. The bicycle rolling-element bearing assembly according to claim 1, wherein the rolling-element bearing assembly comprises a bottom-bracket bearing, a hub bearing, a chain-stay swingarm bearing, a rear-derailleur roller bearing, or a headset- or a steering-tube bearing, and/or the bicycle is a mountain bike.

7. The bicycle rolling-element bearing assembly according to claim 1,
wherein the first cage is configured in a porous manner, the first cage is formed from a polymer matrix.

8. A mountain bicycle comprising the rolling-element bearing assembly according to claim 1.

9. A bicycle rolling-element bearing assembly comprising:
an outer bearing ring,
an inner bearing ring,
a plurality of rolling elements disposed between the outer bearing ring and the inner bearing ring and rotatably supporting the outer bearing ring relative to the inner bearing ring, and
a cage comprising:
a first cage forming a lubricant reservoir for storing and dispensing a lubricant, the first cage including bridge elements extending between the rolling elements and at least one side ring connecting the bridge elements; and
a second cage formed from metal or plastic, the first cage at least partially enclosing the second cage;
wherein the inner bearing ring and the outer bearing ring define a space containing the plurality of rolling elements and the lubricant reservoir, a first seal acts between the inner bearing ring and the outer bearing to seal one side of the space and a second seal acts between the inner bearing ring and the outer bearing ring to seal a second side of the space, wherein the first and second seal each, in combination with the lubricant reservoir define an empty gap which extends from an outer surface of the inner bearing ring to an inner surface of the outer bearing ring; and
wherein the first cage is formed from an oil-impregnated polymer matrix, wherein the first cage occupies at least ninety percent (90%) of the space that is not occupied by the plurality of rolling elements and the second cage.

10. The bicycle rolling-element bearing assembly according to claim 9, wherein first cage comprises a window cage.

11. The bicycle rolling-element bearing assembly according to claim 9, wherein the lubricant reservoir is spaced from the rolling elements and substantially fills a space between the inner bearing ring and the outer bearing ring.

12. The bicycle rolling-element bearing assembly according to claim 9, wherein the second cage is formed from metal.

13. The bicycle rolling-element bearing assembly according to claim 9, wherein the second cage is formed from plastic.

\* \* \* \* \*